United States Patent
K K et al.

(10) Patent No.: US 11,761,347 B2
(45) Date of Patent: Sep. 19, 2023

(54) EXHAUST FRAME DIFFERENTIAL COOLING SYSTEM

(71) Applicant: General Electric Company, Schenectady, NY (US)

(72) Inventors: Mithun Raj K K, Karnataka (IN); Veerraju Chennoju, Karnataka (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 18/148,504

(22) Filed: Dec. 30, 2022

(65) Prior Publication Data

US 2023/0212958 A1 Jul. 6, 2023

(30) Foreign Application Priority Data

Jan. 5, 2022 (IN) .............................. 202211000615

(51) Int. Cl.
| | |
|---|---|
| *F01D 25/12* | (2006.01) |
| *F01D 25/14* | (2006.01) |
| *F01D 9/06* | (2006.01) |
| *F01D 25/28* | (2006.01) |

(52) U.S. Cl.
CPC .......... *F01D 25/125* (2013.01); *F01D 9/065* (2013.01); *F01D 25/14* (2013.01); *F01D 25/28* (2013.01); *F05D 2220/32* (2013.01); *F05D 2260/232* (2013.01); *F05D 2260/60* (2013.01); *F05D 2270/303* (2013.01)

(58) Field of Classification Search
CPC ........ F01D 25/125; F01D 9/065; F01D 25/14; F01D 25/28; F05D 2220/32; F05D 2260/232; F05D 2260/60; F05D 2270/303
See application file for complete search history.

(56) References Cited

U.S. PATENT DOCUMENTS

| | | | |
|---|---|---|---|
| 6,379,108 B1* | 4/2002 | Schmidt | F01D 5/081 415/138 |
| 6,691,019 B2* | 2/2004 | Seeley | F01D 21/04 701/100 |
| 8,177,483 B2* | 5/2012 | McCallum | F01D 11/22 415/14 |
| 8,641,362 B1* | 2/2014 | Liang | F01D 9/065 415/115 |
| 8,801,370 B2 | 8/2014 | Erickson et al. | |

(Continued)

*Primary Examiner* — Jesse S Bogue
(74) *Attorney, Agent, or Firm* — Eversheds Sutherland (US) LLP

(57) ABSTRACT

The present application provides an exhaust frame differential cooling system of a gas turbine engine to mitigate a temperature differential along a compressor and/or a turbine to minimize centerline eccentricity of a shaft. The exhaust frame differential cooling system may include a number of compressor temperature sensors positioned about the compressor and/or a number of turbine temperature sensors positioned about the turbine, an exhaust frame including an inner barrel with a bearing tunnel for the shaft, an outer barrel, and a number of struts extending from the inner barrel to the outer barrel, a blower, and a cooling air metering system that provides cooling air from the blower to the bearing tunnel and through the inner barrel, the struts, and the outer barrel in response to the temperature differential being determined along the compressor and/or the turbine.

20 Claims, 5 Drawing Sheets

(56) References Cited

U.S. PATENT DOCUMENTS

| | | | |
|---|---|---|---|
| 9,567,873 B2 * | 2/2017 | Ueda | F01D 25/305 |
| 11,668,206 B1 * | 6/2023 | Safford | F01D 17/145 |
| | | | 415/177 |
| 2013/0084172 A1 * | 4/2013 | Kasibhotla | F02C 7/12 |
| | | | 415/182.1 |
| 2015/0354382 A1 * | 12/2015 | Pakkala | F01D 9/065 |
| | | | 60/806 |
| 2017/0067365 A1 * | 3/2017 | Mukhopadhyay | F01D 9/065 |
| 2017/0138264 A1 * | 5/2017 | Tham | F01D 25/30 |
| 2018/0149085 A1 * | 5/2018 | Chennoju | F02C 7/18 |

* cited by examiner

EXHAUST FRAME DIFFERENTIAL COOLING SYSTEM

CROSS-REFERENCE TO RELATED APPLICATIONS

This application claims priority pursuant to 35 U.S.C. 119(a) to Indian Patent Application No. 202211000615, filed Jan. 5, 2022, which application is incorporated herein by reference in its entirety.

TECHNICAL FIELD

The present application and the resultant patent relate generally to gas turbine engines and more particularly relate to a differential cooling system for gas turbine engine exhaust frames used to maintain component alignment under different operating conditions.

BACKGROUND

In a gas turbine engine, hot combustion gases generated in one or more combustors generally may flow along a hot gas path extending through a turbine and an exhaust frame. The exhaust frame may include an inner barrel, an outer barrel, and a number of struts extending between the inner barrel and the outer barrel. The inner barrel may house a shaft bearing that supports a main shaft of the gas turbine engine therein. The turbine and the exhaust frame may be subjected to high temperatures resulting from the flow of combustion gases along the hot gas path, which may result in the generation of high thermal stresses in these components and the interfaces therebetween. Because the efficiency of a gas turbine engine is dependent on the operating temperatures, there is an ongoing demand for components positioned along and within the hot gas path to be capable of withstanding increasingly higher temperatures without deterioration, failure, or a decrease in the overall useful lifetime.

In certain gas turbine configurations, due to the tendency of hot air to rise, top-to-bottom temperature gradients may develop therein that may lead to "back bone bending" of the components therein. Such bending may lead to rotor to casing eccentricities or misalignment during the operation and may cause the gap between the casing and the rotor blades to close. Closing the gap may lead to rubbing and material removal from the casing and/or the blades. Such a configuration may lead to performance decay and even may lead to blade failure.

SUMMARY

The present application and the resultant patent provide an exhaust frame differential cooling system for a gas turbine engine to mitigate a temperature differential along a compressor and/or a turbine so as to minimize centerline eccentricity of a shaft. The exhaust frame differential cooling system may include a number compressor temperature sensors positioned about the compressor and/or a number of turbine temperature sensors positioned about the turbine, an exhaust frame downstream of the turbine, the exhaust frame including an inner barrel with a bearing tunnel for the shaft, an outer barrel surrounding the inner barrel, and a number of struts extending from the inner barrel to the outer barrel, a blower, and a cooling air metering system that provides cooling air from the blower to the bearing tunnel and through the inner barrel, the struts, and the outer barrel in response to the temperature differential determined along the compressor and/or the turbine.

The present application and the resultant patent further provide a method of mitigating a temperature differential across a compressor and/or a turbine so as to minimize centerline eccentricity of a shaft of a gas turbine engine. The method may include the steps of measuring a temperature differential across the compressor and/or the turbine, activating a cooling air metering system positioned about a bearing tunnel of an exhaust frame if a temperature differential is detected, and blowing cooling air through the bearing tunnel of an exhaust frame to minimize centerline eccentricity of the shaft.

The present application and the resultant patent further provide a gas turbine engine. The gas turbine may include a compressor with a pair of compressor thermocouples, a turbine with a pair of turbine thermocouples, an exhaust frame downstream of the turbine, the exhaust frame having an inner barrel with a bearing tunnel, an outer barrel surrounding the inner barrel, and a number of struts extending from the inner barrel to the outer barrel, a shaft extending through the compressor, the turbine, and the exhaust frame, a blower, and a cooling air metering system that provides cooling air from the blower to the bearing tunnel and through the inner barrel, the struts, and the outer barrel in response to a temperature differential determined along the compressor by the pair of compressor thermocouples and/or along the turbine by the pair of turbine thermocouples.

These and other features and improvements of this application and the resultant patent will become apparent to one of ordinary skill in the art upon review of the following detailed description when taken in conjunction with the several drawings and the appended claims.

DETAILED DESCRIPTION

Figure 1A:
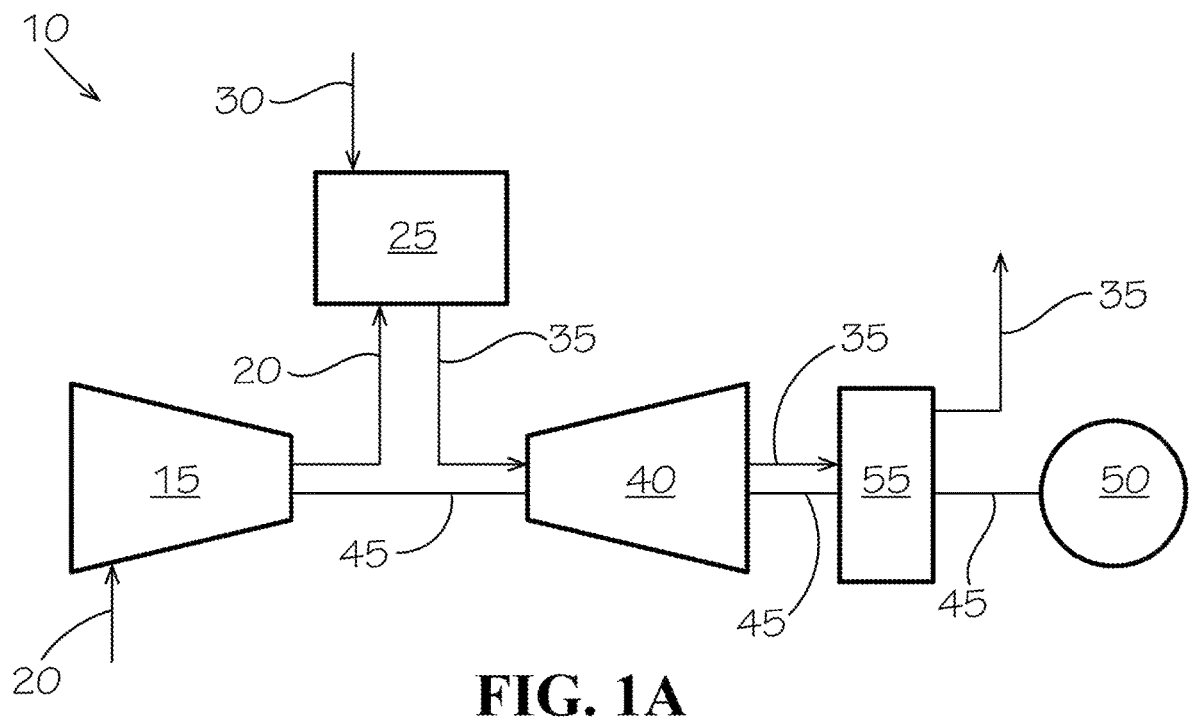
FIG. 1A is a schematic diagram of a gas turbine engine including a compressor, a combustor, a turbine, an exhaust frame, and an external load.

Referring now to the drawings, in which like numerals refer to like elements throughout the several views, FIG. 1A shows a schematic diagram of gas turbine engine 10 as may be used with the present exhaust frame differential cooling system. The gas turbine engine 10 may include a compressor 15. The compressor 15 compresses an incoming flow of air 20. The compressor 15 delivers the compressed flow of air 20 to a number of combustor cans 25. The combustor cans 25 mix the compressed flow of air 20 with a pressurized flow of fuel 30 and ignite the mixture to create a flow of hot combustion gases 35. Although only a single combustor can 25 is shown, the gas turbine engine 10 may include any number of combustor cans 25 positioned in a circumferential array and the like. Alternatively, the combustor 25 may be an annular combustor. The flow of the hot combustion gases 35 is in turn delivered to a turbine 40. The flow of the hot combustion gases 35 drives the turbine 40 to produce mechanical work. The mechanical work produced in the turbine 40 drives, via a shaft 45, the compressor 15 and an external load 50, such as an electrical generator and the like.

The flow of combustion gases 35 is delivered from the turbine 40 to an exhaust frame 55 positioned downstream thereof. The exhaust frame 55 may contain and direct the flow of combustion gases 35 to other components of the gas turbine engine 10. For example, the exhaust frame 55 may direct the flow of combustion gases 35 to an exhaust plenum or an exhaust diffuser. Other configurations and other components may be used herein.

The gas turbine engine 10 may use natural gas, various types of syngas, liquid fuels, and/or other types of fuels and blends thereof. The gas turbine engine 10 may be any one of a number of different gas turbine engines offered by General Electric Company of Schenectady, N.Y., including, but not limited to, those such as a 7-series or a 9-series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 1B:
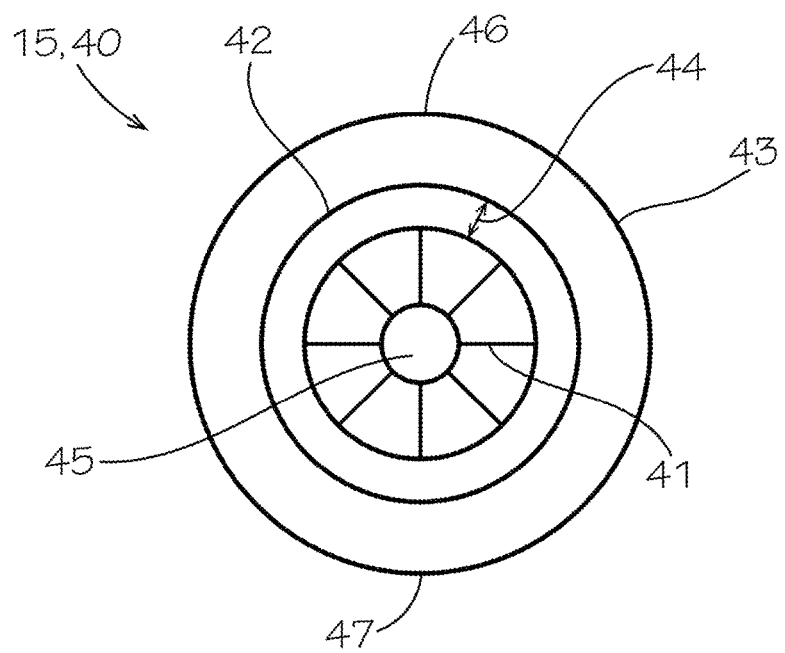
FIG. 1B is a section view of the compressor or the turbine of FIG. 1A showing an outer casing, an inner shroud, a number of blades, and the rotor.

As is shown in FIG. 1B, both the compressor 15 and the turbine 40 may have a number of individual buckets or blades 41 mounted on the shaft 45 for rotation therewith. The blades 41 rotate within an inner shroud 42 which is concentric within an outer casing 43. A blade tip clearance 44 is desired between the tips of the blades 41 and the inner shroud 42. This clearance is exaggerated in FIG. 1B for the purpose of illustration. As will be described in more detail below, a temperature gradient may develop between a top 46 and a bottom 47 of the outer casing 43. Such a temperature gradient may create shaft 45 to inner shroud 42 centerline eccentricity.

Figure 2:
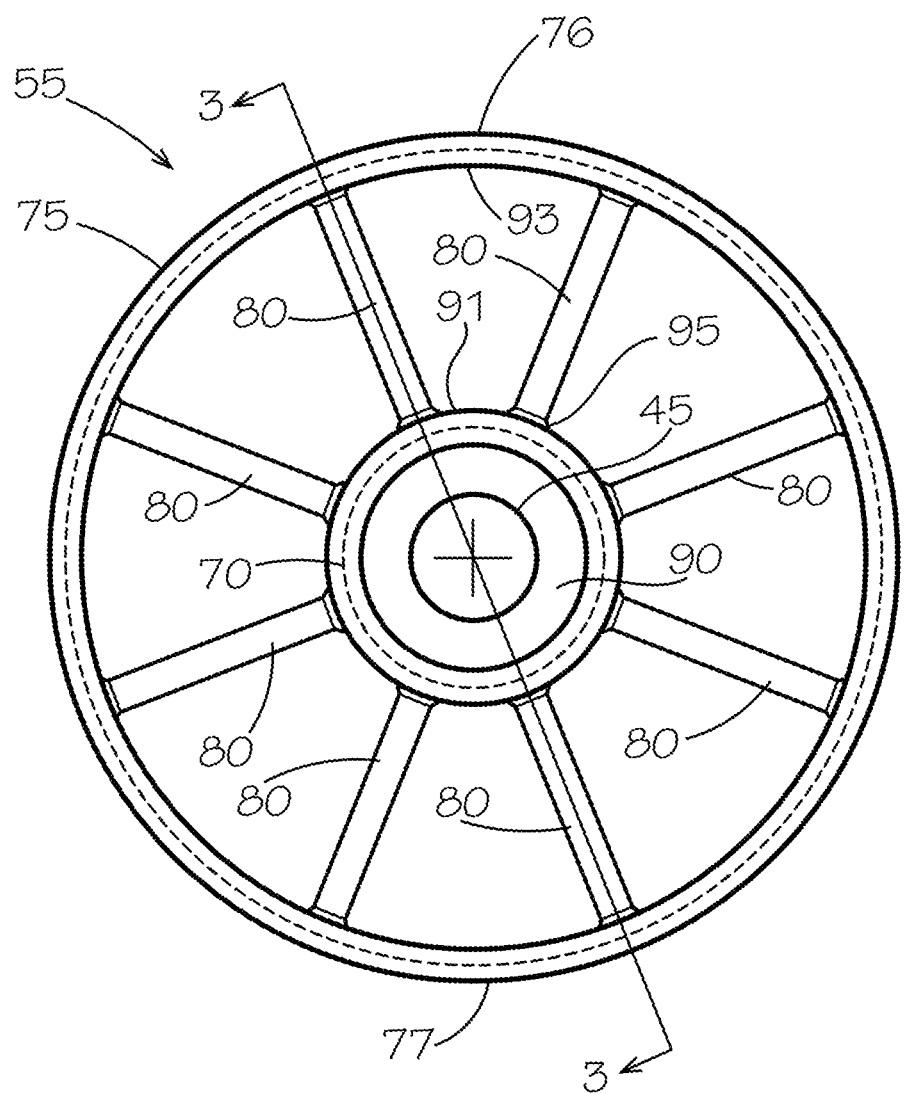
FIG. 2 is an end view of an exhaust frame that may be used with the gas turbine engine of FIG. 1A.
Figure 3:
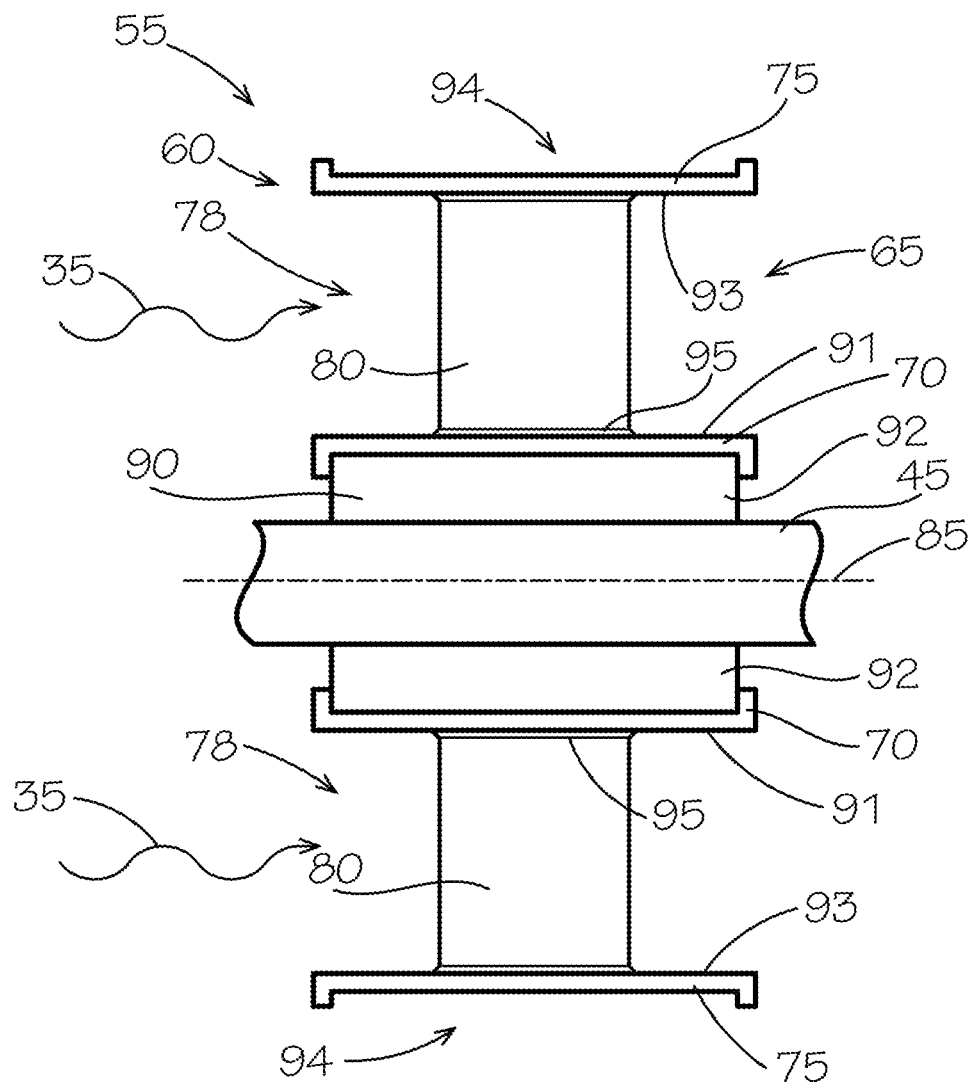
FIG. 3 is a partial sectional view of the exhaust frame of FIG. 2, taken along line 3-3, showing the inner barrel, the outer barrel, and two of the struts.

FIGS. 2 and 3 show the exhaust frame 55 in detail. The exhaust frame 55 may have a leading or upstream end 60 and a trailing or downstream end 65. The exhaust frame 55 may be configured to contain and direct the flow of combustion gases 35 to other components of the gas turbine engine 10, such as an exhaust plenum or an exhaust diffuser positioned downstream of the exhaust frame 55.

The exhaust frame 55 may include an inner barrel 70, an outer barrel 75 surrounding the inner barrel 70, and one or more struts 80 extending between the inner barrel 70 and the outer barrel 75. The inner barrel 70 may be formed as a tube-shaped body extending axially along and coaxial with a longitudinal axis 85 of the exhaust frame 55. The inner barrel 70 may house a bearing tunnel 90 that supports the shaft 45 of the gas turbine engine 10 for rotation therein. The inner barrel 70 may define an inner exhaust frame wall 91 and a shaft bearing cavity 92. The outer barrel 75 may define an outer exhaust frame wall 93, which may in turn define a portion of a purge cavity 94 (e.g., an annular space between the outer casing and the strut).

The outer barrel 75 may be formed as a tube-shaped body extending along and coaxial with the longitudinal axis 85 of the exhaust frame 55. The outer barrel 75 may be spaced apart from and positioned radially outward from the inner barrel 70. In this manner, the inner barrel 70 and the outer barrel 75 may define a portion of a hot gas path 78 therebetween (i.e., the annular space between the inner exhaust frame wall 91 of the inner barrel 70 and the outer exhaust frame wall 93 of the outer barrel 75). The outer barrel 75 may define a circumference including a top 76 and a bottom 77.

During operation of the gas turbine engine 10, the combustion gases 35 flowing along the hot gas path 78 may be contained between the inner barrel 70 and the outer barrel 75 and may flow between and over the struts 80. The inner barrel 70 may be formed as a single component or may include a number of segments joined together to form the inner barrel 70. Similarly, the outer barrel 75 may be formed as a single component or may include a number of segments joined together to form the outer barrel 75. Although the inner barrel 70 and the outer barrel 75 are shown as having circular cross-sectional shapes, other shapes may be used in other configurations.

The struts 80 may extend radially from the inner barrel 70 to the outer barrel 75 with respect to the longitudinal axis 85 of the exhaust frame 55. The struts 80 may be arranged in a circumferential array about the longitudinal axis 85. Although eight struts 80 are shown in FIG. 2, the exhaust frame 55 may include any number of the struts 80 extending between the inner barrel 70 and the outer barrel 75. Each strut 80 may be attached at a radially inner end thereof to the inner barrel 70 and may be attached at a radially outer end thereof to the outer barrel 75. In particular, each strut 80 may include a flange 95 at the radially inner end thereof at an interface with the inner barrel 70. The flange 95 may be used to secure the strut 80 to the inner barrel 70. The flange 95 may be welded or otherwise attached to the inner barrel 70 to prevent separation between the strut 80 and the inner barrel 70. Other component and other configurations may be used herein.

Figure 4:
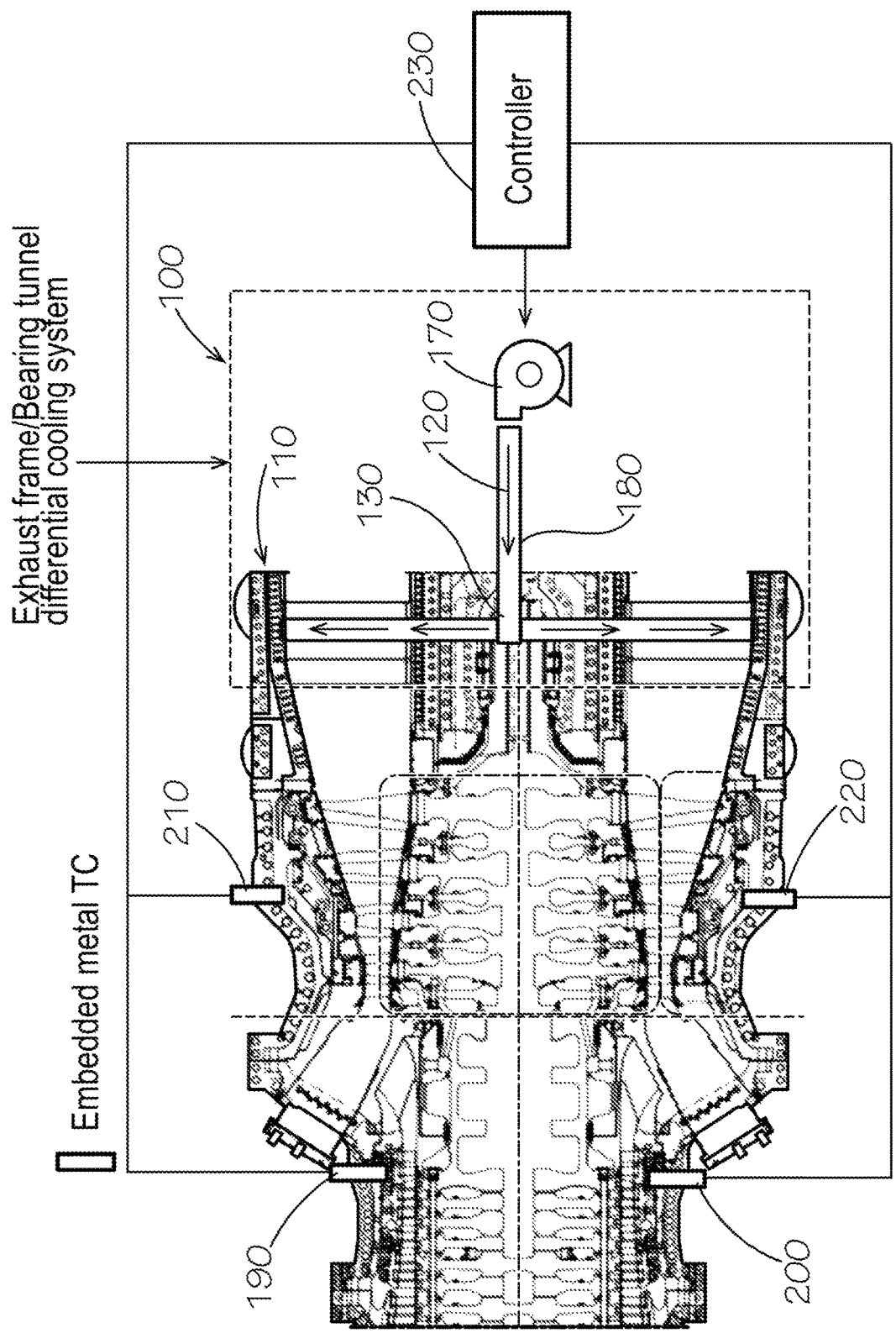
FIG. 4 is a schematic view of an example exhaust frame differential cooling system as described herein.
Figure 5:
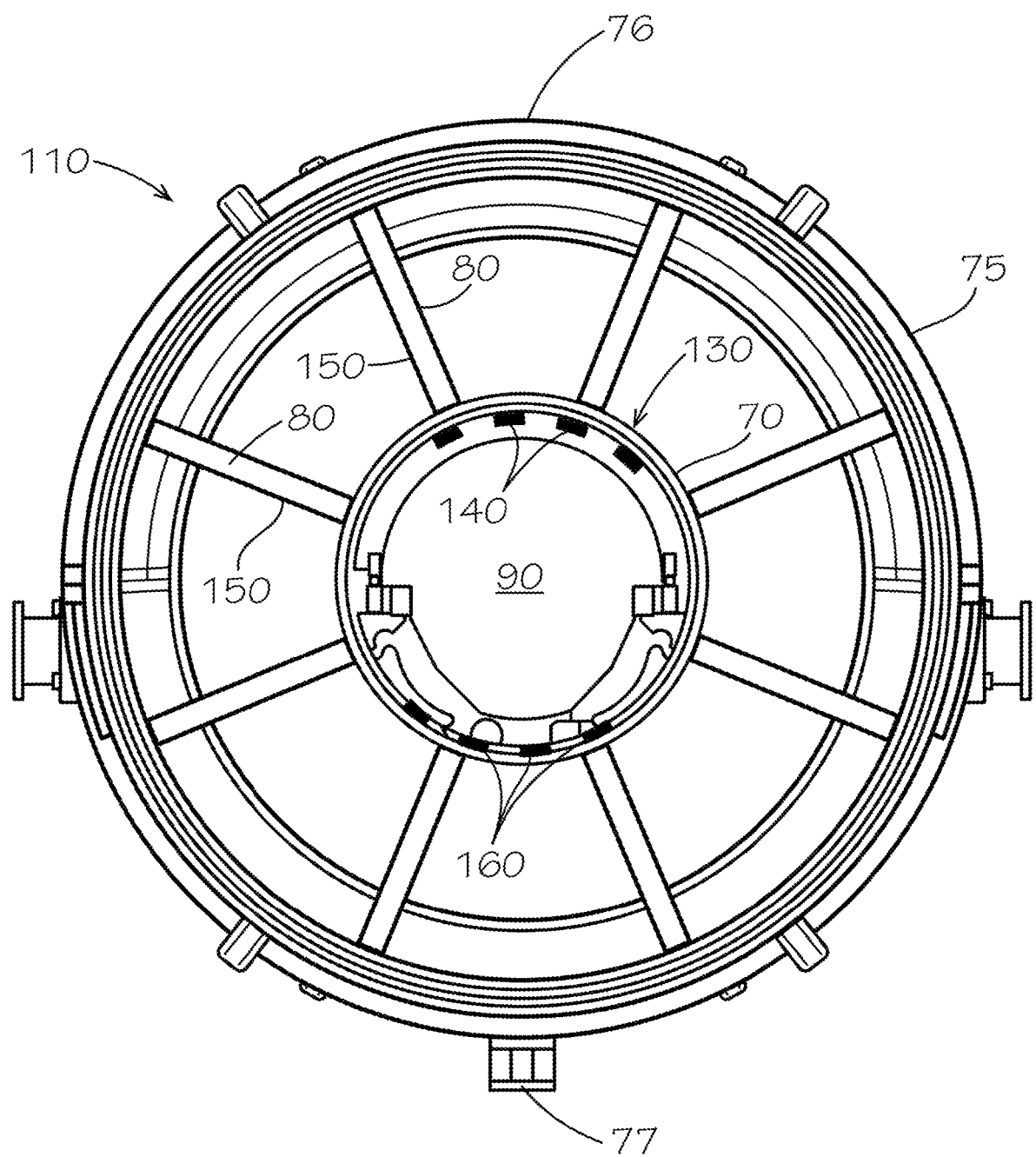
FIG. 5 is an end view of the exhaust frame differential cooling system of FIG. 4.

FIGS. 4 and 5 show an exhaust frame differential cooling system 100 as described herein. The exhaust frame differential cooling system 100 may be used with a modified exhaust frame 110. The modified exhaust frame 100 may be similar to the exhaust frame 55 described above in that it includes the inner barrel 70, the outer barrel 75, and a number of struts 80. The inner barrel 70 defines the bearing tunnel 90 for the shaft 45. The exhaust frame differential cooling system 100 may provide a metered flow of cooling air 120 to the modified exhaust frame 110 as will be described in more detail below.

The exhaust frame 110 may include a cooling air metering system 130. The cooling air metering system 130 may include a number of strut cooling air feeding holes 140 extending through the inner barrel 70 from the bearing tunnel 90 to the struts 80. The strut cooling air feeding holes 140 may be in communication with one or more strut cooling passages 150 extending through one or more of the struts 80. The strut cooling passages 150 may extend through the one or more struts 80 to the outer barrel 75. Other components and other configurations may be used herein.

The cooling air metering system 130 further includes a number of cooling air control plates 160. The cooling air control plates 160 meter the flow of cooling air 140 through the strut cooling air feeding holes 140 by altering the area of the entrance thereto. The cooling air control plates 160 thus may be positioned such that any given strut cooling air feeding hole 140 may be completely open, completely closed, or at any position therebetween so as to vary the volume of the cooling air 120 therethrough. Each cooling air control plate 160 may be operated independently. Although the term "plate" is used herein, it is understood that any type variable metering device may be used herein. Other components and other configurations may be used herein.

The exhaust frame differential cooling system 100 may include a blower 170 in communication with the bearing tunnel 90 and the cooling air metering system 130. The blower 170 may be any type of air movement device. The blower 170 may have a fixed speed or a variable speed. The blower 170 may be in communication with the bearing tunnel 90 via a blower conduit 180. Other components and other configurations may be used herein.

The exhaust frame differential cooling system 100 may include a number of temperature sensors positioned about the compressor 15, the turbine 40, or elsewhere. The temperature sensors may be conventional thermocouples and the like. Other types of sensors, such as clearance probes, pressure sensors, and the like also may be used herein. In this example, four thermocouples are shown: an upper compressor thermocouple 190, a lower compressor thermocouple 200, an upper turbine thermocouple 210, and a lower turbine thermocouple 220. Any number of thermocouples may be used herein in any position. The thermocouples may be any type of conventional temperature measuring device. Specifically, the thermocouples may be embedded in the metal of the outer casings 43 of the compressor 15 and/or the turbine 40. Other components and other configurations may be used herein.

The exhaust frame differential cooling system 100 may include a controller 230. Specifically, the cooling air control plates 160 of the cooling air metering system 130, the blower 170, and the thermocouples 190, 200, 210, 220 may be in communication with the controller 230. The controller 230 may be any type of programmable logic device, such as a microcomputer and the like, operated by control logic. More than one controller 230 may be used. The controller 230 may be dedicated to the exhaust frame differential cooling system 100 or part of the overall control of the gas turbine engine 10. The controller 230 may be local or remote. Not all of the connections between the controller 230 and the various components are shown for purposes of clarity.

In use, the exhaust frame differential cooling system 100 is configured to control the internal alignment of the blades 41 and the shaft 45 to counteract any circumferential temperature differential determined in the outer casings 43 of the compressor 15 and/or the turbine 40 that may lead to shaft 45 to casing 43 centerline eccentricities. Specifically, if the upper compressor thermocouple 190 and the lower compressor thermocouple 200 and/or the upper turbine thermocouple 210 and the lower turbine thermocouple 220 determine that a temperature gradient exists across the top 46 or the bottom 47 of the outer casing 43 of the compressor 15 and/or the turbine 40, the controller 230 of the exhaust frame differential cooling system 100 may activate the blower 170 and the cooling air metering system 130. The blower 170 will direct a flow of the cooling air 120 into the bearing tunnel 90. From the bearing tunnel 90, the flow of cooling air 120 is directed in whole or in part through the struts 80 to the top 76 or bottom 77 of the outer barrel 75. The cooling air metering system 130 will create a differential flow between the top 76 and the bottom 77 of the outer barrel 75 by metering the strut cooling air feeding holes 140 to direct more of the flow of cooling air 120 to hot regions (such as the top 76) to mitigate the temperature differential. Such actions reposition the bearing tunnel 90 to counteract a misalignment in the outer casings 43 cause by the temperature differential.

The exhaust frame differential cooling system 100 thus actively controls internal alignments and clearances in a closed loop system. The exhaust frame differential cooling system 100 preserves overall gas turbine performance by avoiding blade rubs and the like to maintain the desired alignment. The exhaust frame differential cooling system 100 may be active in all operating conditions including full speed and shut down. The thermocouples 190, 200, 210, 220 determine the temperature differentials across the outer casing 43 and inputs that data to the controller 230. The controller 230 then calculates the flow requirements at discrete locations based up on the temperature input. The blower 170 and the cooling air metering system 130 then send cooling air 120 into the bearing tunnel 90 and the overall exhaust frame 110 at differential rates around the circumference of the exhaust frame to counteract any imbalance therein.

It should be apparent that the foregoing relates only to certain embodiments of this application and resultant patent. Numerous changes and modifications may be made herein by one of ordinary skill in the art without departing from the general spirit and scope of the invention as defined by the following claims and the equivalents thereof.

The present exhaust frame differential cooling system, method of use, and gas turbine engine with the exhaust frame differential cooling system may be described using the clauses provided below:

A first aspect of the present disclosure provides an exhaust frame differential cooling system of a gas turbine engine to mitigate a temperature differential along a compressor and/or a turbine to minimize centerline eccentricity in a shaft, comprising: a plurality of compressor temperature sensors positioned about the compressor and/or a plurality of turbine temperature sensors positioned about the turbine; an exhaust frame downstream from the turbine, the exhaust frame comprising an inner barrel with a bearing tunnel for the shaft, an outer barrel surrounding the inner barrel, and a plurality of struts extending from the inner barrel to the outer barrel; a blower; and a cooling air metering system that provides cooling air from the blower to the bearing tunnel and through the inner barrel, the plurality of struts, and the outer barrel in response to the temperature differential determined along the compressor and/or the turbine.

The exhaust frame differential cooling system according to the previous clause, wherein the cooling air metering system comprises a plurality of strut cooling air feeding holes extending between the inner barrel and the plurality of struts.

The exhaust frame differential cooling system according to any previous clause, wherein the cooling air metering system comprises a plurality of cooling air control plates positioned about the plurality of strut cooling air feeding holes.

The exhaust frame differential cooling system according to any previous clause, wherein the plurality of struts comprises a plurality of strut cooling passages extending from the plurality of strut cooling air feeding holes to the outer barrel.

The exhaust frame differential cooling system according to any previous clause, further comprising a blower conduit extending between the blower and the bearing tunnel of the inner barrel.

The exhaust frame differential cooling system according to any previous clause, wherein the plurality of compressor temperature sensors comprises an upper compressor temperature sensor and a lower compressor temperature sensor.

The exhaust frame differential cooling system according to any previous clause, wherein the plurality of turbine temperature sensors comprises an upper turbine temperature sensor and a lower turbine temperature sensor.

The exhaust frame differential cooling system of according to any previous clause, wherein the bearing tunnel comprises a shaft bearing cavity therein for the shaft.

The exhaust frame differential cooling system of according to any previous clause, further comprising a controller in communication with the plurality of compressor temperature sensors, the plurality of turbine temperature sensors, the cooling air metering system, and the blower.

The exhaust frame differential cooling system according to any previous clause, wherein the outer barrel comprises a top and a bottom.

The exhaust frame differential cooling system according to any previous clause, wherein the cooling air metering system directs the cooling air to the top or bottom of the outer barrel in whole or in part.

The exhaust frame differential cooling system according to any previous clause, wherein the plurality of struts comprises eight struts.

The exhaust frame differential cooling system according to any previous clause, wherein the compressor comprises a compressor casing; and wherein the plurality of compressor temperature sensors is positioned about the compressor casing.

The exhaust frame differential cooling system according to any previous clause, wherein the turbine comprises a turbine casing; and wherein the plurality of turbine temperature sensors is positioned about the turbine casing.

A second aspect of the present disclosure provides a method of mitigating a temperature differential across a compressor and/or a turbine to minimize centerline eccentricity of a shaft of a gas turbine engine, the method comprising: measuring a temperature differential across the compressor and/or the turbine; activating a cooling air metering system positioned about a bearing tunnel of an exhaust frame if a temperature differential is detected; and blowing cooling air through the bearing tunnel of the exhaust frame to minimize centerline eccentricity of the shaft.

A third aspect of the present disclosure provides a gas turbine engine, comprising: a compressor with a pair of compressor thermocouples; a turbine with a pair of turbine thermocouples; an exhaust frame downstream from the turbine, the exhaust frame comprising an inner barrel with a bearing tunnel, an outer barrel surrounding the inner barrel, and a plurality of struts extending from the inner barrel to the outer barrel; a shaft extending through the compressor, the turbine, and the exhaust frame; a blower; and a cooling air metering system that provides cooling air from the blower to the bearing tunnel and through the inner barrel, the plurality of struts, and the outer barrel in response to a temperature differential determined along the compressor by the pair of compressor thermocouples and/or along the turbine by the pair of turbine thermocouples.

The gas turbine engine according to any preceding clause, wherein the cooling air metering system comprises a plurality of strut cooling air feeding holes extending between the inner barrel and the plurality of struts.

The gas turbine engine according to any preceding clause, wherein the cooling air metering system comprises a plurality of cooling air control plates positioned about the plurality of strut cooling air feeding holes.

The gas turbine engine according to any preceding clause, wherein the plurality of struts comprises a plurality of strut cooling passages extending from the plurality of strut cooling air feeding holes to the outer barrel.

The gas turbine engine according to any preceding clause, further comprising a controller in communication with the plurality of compressor thermocouples, the plurality of turbine thermocouples, the cooling air metering system, and the blower.

We claim:

1. An exhaust frame differential cooling system of a gas turbine engine to mitigate a temperature differential along a compressor and/or a turbine to minimize centerline eccentricity in a shaft, comprising:
    a plurality of compressor temperature sensors positioned about the compressor and/or a plurality of turbine temperature sensors positioned about the turbine;
    an exhaust frame downstream from the turbine, the exhaust frame comprising an inner barrel with a bearing tunnel for the shaft, an outer barrel surrounding the inner barrel, a plurality of struts extending from the inner barrel to the outer barrel;
    a blower; and
    a cooling air metering system that provides cooling air from the blower to the bearing tunnel and through the inner barrel, the plurality of struts, and the outer barrel in response to a circumferential temperature differential determined along the compressor and/or the turbine.

2. The exhaust frame differential cooling system of claim 1, wherein the cooling air metering system comprises a plurality of strut cooling air feeding holes extending between the inner barrel and the plurality of struts.

3. The exhaust frame differential cooling system of claim 2, wherein the cooling air metering system comprises a plurality of cooling air control plates positioned about the plurality of strut cooling air feeding holes.

4. The exhaust frame differential cooling system of claim 2, wherein the plurality of struts comprises a plurality of strut cooling passages extending from the plurality of strut cooling air feeding holes to the outer barrel.

5. The exhaust frame differential cooling system of claim 1, further comprising a blower conduit extending between the blower and the bearing tunnel of the inner barrel.

6. The exhaust frame differential cooling system of claim 1, wherein the plurality of compressor temperature sensors comprises an upper compressor temperature sensor and a lower compressor temperature sensor.

7. The exhaust frame differential cooling system of claim 1, wherein the plurality of turbine temperature sensors comprises an upper turbine temperature sensor and a lower turbine temperature sensor.

8. The exhaust frame differential cooling system of claim 1, wherein the bearing tunnel comprises a shaft bearing cavity therein for the shaft.

9. The exhaust frame differential cooling system of claim 1, further comprising a controller in communication with the plurality of compressor temperature sensors, the plurality of turbine temperature sensors, the cooling air metering system, and the blower.

10. The exhaust frame differential cooling system of claim 1, wherein the outer barrel comprises a top and a bottom.

11. The exhaust frame differential cooling system of claim 10, wherein the cooling air metering system directs the cooling air to the top or bottom of the outer barrel in whole or in part.

12. The exhaust frame differential cooling system of claim 1, wherein the plurality of struts comprises eight struts.

13. The exhaust frame differential cooling system of claim 1, wherein the compressor comprises a compressor casing and wherein the plurality of compressor temperature sensors is positioned about the compressor casing.

14. The exhaust frame differential cooling system of claim 1, wherein the turbine comprises a turbine casing and wherein the plurality of turbine temperature sensors is positioned about the turbine casing.

15. A method of mitigating a temperature differential across a compressor and/or a turbine to minimize centerline eccentricity of a shaft of a gas turbine engine, the method comprising:
   measuring a temperature differential across the compressor and/or the turbine;
   activating a cooling air metering system positioned about a bearing tunnel of an exhaust frame if a circumferential temperature differential is detected; and
   blowing cooling air through the bearing tunnel of the exhaust frame to minimize centerline eccentricity of the shaft.

16. A gas turbine engine, comprising:
   a compressor with a pair of compressor thermocouples;
   a turbine with a pair of turbine thermocouples;
   an exhaust frame downstream of the turbine, the exhaust frame comprising an inner barrel with a bearing tunnel, an outer barrel surrounding the inner barrel, and a plurality of struts extending from the inner barrel to the outer barrel;
   a shaft extending through the compressor, the turbine, and the exhaust frame;
   a blower; and
   a cooling air metering system that provides cooling air from the blower to the bearing tunnel and through the inner barrel, the plurality of struts, and the outer barrel in response to a circumferential temperature differential determined along the compressor by the pair of compressor thermocouples and/or along the turbine by the pair of turbine thermocouples.

17. The gas turbine engine of claim 16, wherein the cooling air metering system comprises a plurality of strut cooling air feeding holes extending between the inner barrel and the plurality of struts.

18. The gas turbine engine of claim 17, wherein the cooling air metering system comprises a plurality of cooling air control plates positioned about the plurality of strut cooling air feeding holes.

19. The gas turbine engine of claim 17, wherein the plurality of struts comprises a plurality of strut cooling passages extending from the plurality of strut cooling air feeding holes to the outer barrel.

20. The gas turbine engine of claim 16, further comprising a controller in communication with the plurality of compressor thermocouples, the plurality of turbine thermocouples, the cooling air metering system, and the blower.

* * * * *